Patented June 5, 1928.

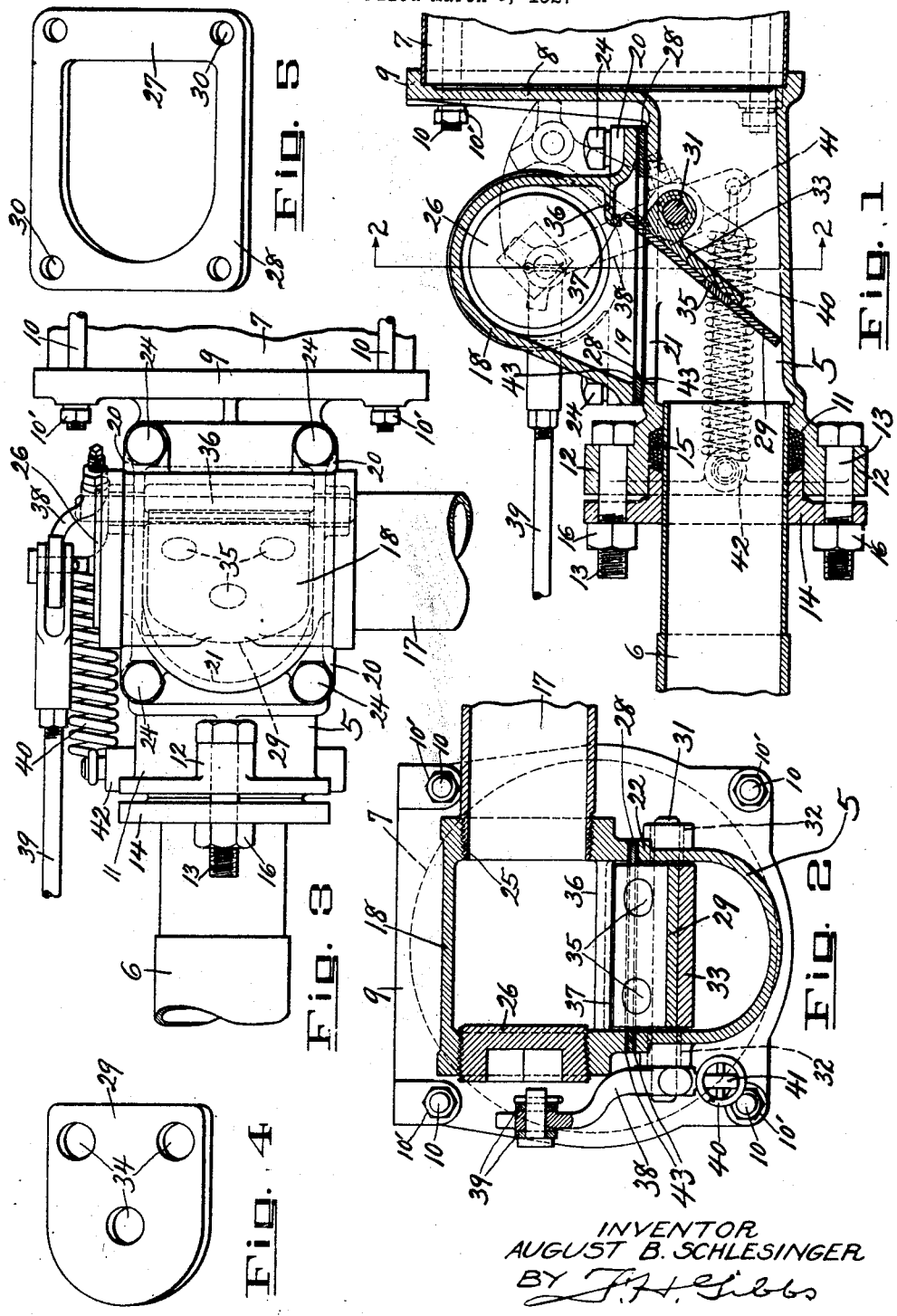

1,672,096

UNITED STATES PATENT OFFICE.

AUGUST B. SCHLESINGER, OF DETROIT, MICHIGAN, ASSIGNOR TO AMERICAN CAR AND FOUNDRY MOTORS COMPANY, OF NEW YORK, N. Y., A CORPORATION OF DELAWARE.

EXHAUST-GAS-CONTROL VALVE.

Application filed March 3, 1927. Serial No. 172,548.

The accompanying drawings illustrate the preferred form of the invention; though it is to be understood that the invention is not limited to the exact details of construction shown and described, as it is obvious that various modifications thereof within the scope of the claims will occur to persons skilled in the art.

In said drawings:

Figure 1 is a vertical sectional view of an exhaust gas control valve constructed in accordance with my invention and associated with the exhaust line and muffler of an automobile;

Fig. 2 is a vertical sectional view taken on line 2—2, Fig. 1;

Fig. 3 is a top plan view of the invention;

Fig. 4 is a perspective of the valve element; and

Fig. 5 is a perspective of the valve plate or seat.

My invention relates to valves and more particularly to a valve for controlling the passage of exhaust gases either to an automobile heater or to the atmosphere.

The invention has as its principal object the provision of an exhaust gas control valve which is entirely free from vibration due to the exhaust gas pulsations and to the high temperature the valve is subjected to by the heat of these exhaust gases.

The invention also contemplates a valve assembly for controlling the passage of exhaust gases to an automobile heater or to an exhaust muffler which is free from distortion by the heat of exhaust gases or from other causes and thus improper closing or seating is eliminated.

Further, the invention provides a valve element which is punched out of suitable sheet material and utilizes the remainder of the sheet material from which the valve is punched, as a valve plate or frame, and thereby keeping the cost of manufacture to a minimum.

Another object of this invention is to provide a valve assembly for controlling the passage of gases from an exhaust line which assembly is so formed as to prevent the accumulation of carbon or other foreign matter thereon whereby the valve may be always retained in close seating relation with its valve seat.

Referring to the invention in detail, a cylinder or conduit 5 is provided for establishing communication between the engine exhaust pipe 6 and exhaust muffler 7. The rear end of the conduit 5 is formed with an integral plate extension 8 having an annular flange or shoulder 9 embracing the inner end of the muffler 7. Clamping bolts 10 extending longitudinally of the muffler 7 have their inner ends passed through the corners of the plate 8 and receive nuts 10' for securing the plate on the muffler. The opposite ends of the bolts 10 pass through and engage the muffler head at the rear end of the muffler (not shown). A stuffing box 11 is formed with the opposite end of the conduit or cylinder 5 and receives one end of the exhaust pipe 6 and is provided with lateral perforated ears 12 receiving bolts 13 engaging a stuffing box gland 14 accommodated on the pipe 6 and holding it in clamping engagement with packing 15 between the stuffing box and exhaust pipe. Nuts 16 are threaded upon the bolts 13.

For the purpose of conducting exhaust gases from the conduit 5 to a pipe 17 leading to an automobile heater (not shown) a cylindrical housing or casing 18 is provided, the latter being formed with a rectangular open base 19 having pairs of lateral projecting perforated ears 20. The upper face of the conduit or cylinder 5 is provided with a rectangular opening 21 extending substantially the length of the conduit or cylinder and has a rectangular laterally extending flange 22 formed around the edges of this opening. The cylindrical casing or casting 18 is positioned transversely of the conduit or cylinder 5 with its base 19 in registration with the flange 22 and is held thereon by fastenings 24 passing through the ears 20 and engaging the flange 22.

As shown in Figure 2 one end of the casing 18 threadedly receives one end of the pipe 17 as at 25 while the opposite end of the casing receives a threaded plug 26 arranged to be removed for the purpose of cleaning the interior of the device or the valve element to be hereinafter described.

The valve assembly employed with this invention is of particular type more clearly shown in Figs. 1, 4 and 5, and the same comprises a seat 28 and a valve 29. These elements are complementary as is usual in valve constructions and are each formed of metal having high corrosion resistant properties such, for example, as stainless steel. To reduce the cost of manufacture and at the same time provide a cooperating valve and valve seat, I preferably form these elements from a single piece of suitable corrosion resistant metal, and in Fig. 5, 27 indicates a blank having the valve 29 (see Fig. 4) punched therefrom; it being obvious that the resulting elements are complementary. The blank 27 may initially be of the required size and provided with openings 30 for the reception of suitable fasteners, such as the bolts 24, to secure the finished valve seat to the conduit 5, suitable gaskets 43 being employed to effect a gas-tight connection.

Journaled in the conduit or cylinder 5 adjacent one end of its opening 21 is a rock shaft 31. Bronze bushings 32 are provided to obviate rusting of ends of the rock shaft 31. A valve support or arm 33 is secured to the rock shaft 31 and to which arm the valve element 29 is attached. The valve support or arm is welded to the rock shaft 31 while the valve element is secured in a like manner. A plurality of openings 34 are provided in the valve element to take the weld as designated at 35.

In the actual manufacturing of the device, the valve support or arm 33 is welded to the rock shaft while the latter is in position in the conduit or cylinder 5, and the valve element is subsequently welded. This manner of securing the rock shaft, valve support or arm and valve together provides a single integral unit which eliminates distortion by heat and the consequent vibration or improper seating of the valve element.

In order to close the space between the inner edge of the valve element 29 and the lower side wall of the casing 18 when the valve is in the open position shown in Figure 1, a laterally extending baffle wall 36 extends from this side wall of the casing and terminates in a down-turned flange 37 with which the inner edge of the valve element contacts.

A lever 38 is attached intermediate its ends to the rock shaft 31 at a point exteriorly of the cylinder or conduit 5 and has operative connection with an operating rod 39.

To normally return the valve to closed position and retain it in such position, a contractile spring 40 has one end attached to the lower end of the lever 38 as indicated at 41, while its opposite end is anchored to a lug 42 formed on the stuffing box 11.

With my invention, it will be seen that the products of combustion pass through the conduit or cylinder 5 and discharge into the muffler 7 in the usual manner. However, when it is desired to direct the products of combustion into the pipe 17 to enter the heater (not shown), the operating rod 39 is moved in a longitudinal direction to bring the valve to an angular position across the conduit or cylinder 5 as shown in Figure 1, directing the products of combustion upwardly into the casing 18 whence they pass into the pipe 17. It will also be apparent that this invention provides a valve and valve seat which are greatly resistant to corrosion and hence of much greater durability than the valves now employed with similar devices, and it can be seen that carbon or other foreign matter will not be collected on the valve or valve seat, thus providing a structure in which the valve will always properly seat when closing the passage to the casing 18.

What is claimed is:

1. In a device of the kind described having a conduit and a casing communicating therewith, means for obstructing the passage of exhaust gases through the conduit and for directing them into the casing comprising a valve plate between said casing and conduit, and provided with an opening, a baffle in said casing, a valve normally positioned in said valve plate, and means in said conduit for pivotally supporting said valve to permit the same to swing to close the passage through the conduit with an extended end adjacent said pivot in contact with said baffle.

2. In a device of the kind described comprising a conduit arranged to normally establish communication between the exhaust line of an engine and its muffler, a casing supported on the conduit and having communication therewith, a valve support pivotally mounted in the conduit, a valve mounted on said support with its ends extended beyond said support and adapted to close the conduit to prevent passage of exhaust gases to said muffler, and means formed in said casing and so positioned as to contact with the extended rear end of said valve when the latter is in lowered position to close the conduit to passage of exhaust gases to the muffler above the valve support.

3. In a device of the kind described comprising a conduit interposed between the exhaust pipe and muffler of an internal combustion engine and a casing connected to the conduit, a valve plate interposed between the conduit and casing, a valve normally positioned in the valve plate and means supporting said valve intermediate the ends thereof to permit the same to swing in an arc with the forward end of said valve positioned in the conduit to close the same against passage of gases therethrough and with the upper end above said conduit to cooperate with means in the casing to close the upper portion of said conduit against the passage of exhaust gases therethrough.

4. As an article of manufacture, a valve unit comprising a valve element, a supporting arm integrally connected to the element and arranged intermediate the ends thereof, and a rock shaft to which the supporting arm is connected, the rear end of the valve element extending beyond the rock shaft whereby upon rocking of the shaft the valve element rotates in its entirety in an arc.

5. A device of the kind described comprising a conduit arranged intermediate the exhaust pipe and a muffler, a casing secured to the conduit and communicating therewith and receiving pipes, an apertured plate secured to the conduit by said casing to define a valve seat, a rocker arm mounted in the conduit, a valve supporting element secured to the rocker arm, and a valve secured to the supporting element and adapted to be received in the aperture in the plate for normally closing communication from the conduit to the casing.

In witness whereof I have hereunto set my hand.

AUGUST B. SCHLESINGER.